Patented Aug. 19, 1941

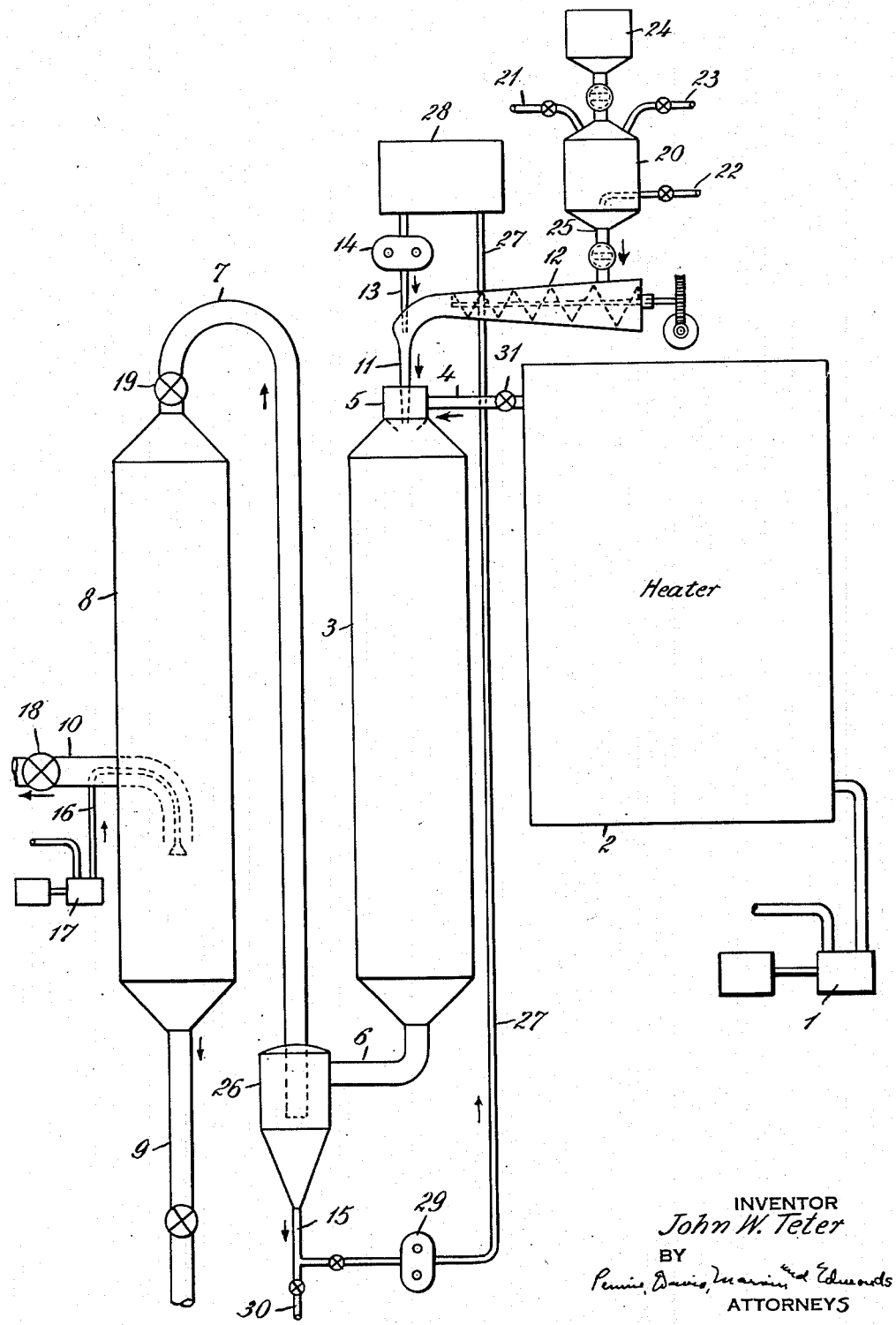

2,252,740

UNITED STATES PATENT OFFICE 2,252,740

CATALYTIC CRACKING

John W. Teter, Chicago, Ill., assignor to Sinclair Refining Company, New York, N. Y., a corporation of Maine Application June 8, 1940, Serial No. 339,460

10 Claims. (Cl. 196—52)

This invention relates to improvements in the catalytic cracking of hydrocarbon oils at elevated temperatures. In one aspect this invention is a further improvement in the improvements in catalytic conversion as applied to catalytic cracking described in my application filed June 8, 1940, Serial No. 339,458. In the catalytic cracking there described, a stream of hydrocarbons is heated to the cracking temperature, a cracking catalyst, fresh and free from hydrocarbons, is introduced into the stream of hydrocarbons after it has reached the conversion temperature, and the mixture of catalyst and hydrocarbons thus effected after the hydrocarbons have reached the cracking temperature is maintained at the cracking temperature for an appropriate period. Specifically, this invention provides improvements in the handling of the cracking catalyst in operations of this general type.

In carrying out this invention, a stream of the oil to be cracked is heated to a cracking temperature and a catalyst is injected into the oil, after the oil has reached the cracking temperature, in a molten carrier such as molten lead, and the oil at cracking temperature and the catalyst thus injected into the oil are maintained in contact at the cracking temperature for a period sufficient to effect substantial cracking. The molten carriers of the invention are thermally stable at the cracking temperature, have a melting point below and a boiling point above the cracking temperature and have a specific gravity substantially higher than that of the oil, and with advantage substantially higher than that of the catalyst, at corresponding temperatures. Metals and metallic alloys which have these properties are generally useful as carriers in accordance with the invention. Metallic carriers have little tendency to wet many of the available cracking catalysts and the combined use of a catalyst and a carrier having substantially no tendency to wet the catalyst in accordance with the invention affords special advantage with respect to separation of catalyst and carrier following introduction of the catalyst with the molten carrier. The cracking catalysts with which this invention is concerned are as a class contact agents tending to absorb, or adsorb, hydrocarbons on the catalyst surface exposed to hydrocarbons. Cracking catalysts with which the invention is useful include fuller's earth, kieselguhr, other natural silicates, synthetic silicates of alumina, zirconia and chromia, various metallic salts, and dispersions of such catalysts which are relatively more active upon fuller's earth or kieselguhr or other silicates, natural or synthetic. Immediately following injection with the carrier, the carrier and the catalyst begin to separate and the catalyst is thus brought into intimate and distributed contact with the stream of oil at a cracking temperature. This contact between the catalyst and the oil is maintained for the period appropriate to effect the desired cracking. The bulk of the spent catalyst is then separated from the cracked oil. The molten carrier may be separated from the cracked oil at the same point as that at which the spent catalyst is separated, although the molten carrier may move through the region in which oil-catalyst contact is maintained more rapidly than the catalyst, or, with advantage, the molten carrier may be separated from the oil and the bulk of the catalyst after the injection and prior to separation of the bulk of the catalyst from the oil. To operate in this manner, the molten carrier used should have substantially no tendency to wet the catalyst used. Some of the advantages of the invention can be secured by the use of molten salt mixtures which are thermally stable at the cracking temperature and which have the specified melting point, boiling point and specific gravity. In general, however, it is advantageous to use metals and alloys of metals which have the specified properties.

The invention will be further described in connection with the accompanying drawing which illustrates, diagrammatically and conventionally and without scale, one form of apparatus in which operations embodying the invention can be carried out.

In the apparatus illustrated in the drawing, the oil to be cracked is forced, by means of pump 1, through serially connected tubes in the heater 2, in which it is heated to a cracking temperature, into the upper end of the digester 3 through connection 4 and nozzle 5 and the hot oil products including cracked products as formed pass through the digestor 3, connections 6 and 7 and the digester 8 to the lower end of the digester 8. The digesters 3 and 8 and the connections 6 and 7 are thermally insulated to maintain the temperature of the oil flowing through them. The hot oil products may be in the form of vapors, liquids, or a mixture of the two as they pass through the digesters 3 and 8. Liquids separating in the lower end of the digester 8 are discharged through connection 9 and vapors, including the lower boiling cracked oil products, are discharged through connection 10. The cracking catalyst is introduced, through connection 11, into the stream of oil at a cracking temperature entering the upper end of digester 3 through nozzle 5, the catalyst supplied through screw feeder 12 is forced into the stream of oil by means of a stream of a molten carrier injected into the upper end of connection 11 through connection 13 by means of pump 14. Using fuller's earth or a dispersion of a more active cracking catalyst as the cracking catalyst and lead as the molten carrier, the molten carrier is discharged through connection 15 from the lower end of a separator 26, operating as a cyclone, between connections 6 and 7 and the bulk of the cracking catalyst is discharged through connection 9 suspended in the liquids discharged through this connection. To insure an adequate supply of carrier liquids in the lower end of digester 8, and to control the cracking reaction, a stream of relatively cool oil is forced into the lower end of digester 8 through connection 16 by means of pump 17 at a rate sufficient to maintain a temperature low enough to provide the necessary liquids at this point. This stream of relatively cool oil is with advantage arranged, as a spray or otherwise, to scrub the separated vapors discharged through connection 10 to facilitate separation of the spent catalyst from the separated vapors. Pressure in the digestors 3 and 8 is controlled by means of valve 18, or by means of valves 18 and 19 if a pressure in digester 3 substantially higher than that in digester 8 is to be maintained, in conjunction with control of the separated molten carrier through connection 15 and of residual liquids and suspended spent catalyst through connection 9. The absorbent catalyst is charged into the pressure supply tank 20 in a fine state of subdivision, for example 85% through a 200 mesh per inch screen or finer. From this tank the catalyst is forced into the screw feeder 12 by means of gas pressure applied through connection 21 and the screw feeder in turn forces the catalyst into the path of the jet of molten carrier moving from the lower end of connection 13 into the upper end of connection 11. A purge connection 22 and a vent connection 23 are provided to eliminate any collected gas from the tank 20 prior to recharging with catalyst through connection 24 by introduction of an inert stripping gas through the purge connection. The connection 22 may also be arranged as illustrated as a jet to accelerate passage of the catalyst through connection 25 from the tank 20 to the screw feeder 12. Positive seals are provided as illustrated in connections 24 and 25. The molten carrier is maintained in circulation through connections 13 and 11, nozzle 5, digester 3, connection 6, separator 26 and connections 15 and 27 from and to the supply vessel 28 by means of pumps 14 and 29. The vessel 28 serves as a supply vessel and in several additional capacities. The molten carrier is either melted in this vessel or supplied to it in a molten state in initiating the operation. Any make-up required during the operation is added to this vessel. Slag or dross forming during operation is separated from the circulating molten carrier in this vessel. Any extraneous heat required to keep the carrier molten during operation is supplied to this vessel. Usually, with proper thermal insulation, the circulating carrier can be maintained in a molten state by the heat picked up from the stream of hot oil discharged from the heater 2 during passage through the digester 3. Following introduction into the upper end of digester 3, the molten carrier begins to separate from the catalyst which is thus left, more or less progressively, in contact with the oil at cracking temperature as the mixture of oil and catalyst moves through the digester. Any oily liquids tending to separate in the separator 26 float on the surface of the molten carrier and by appropriate regulation of the level of this surface can be discharged with the vapors through connection 7 to the digester 8. If necessary, the separator 26 can be purged of any accumulating oily material or carbonaceous residues by occasional discharge of its contents through connections 15 and 30. To control the cracking reaction or to facilitate the separation of spent catalyst, for example, the vapors discharged from the digester 3 through connection 7 can be expanded through valve 19 by maintaining a higher pressure on digester 3 than on digester 8. The residual liquids and suspended spent catalyst discharged through connection 9 can be processed in any convenient way for the recovery of oil content or catalyst values or both. The vapors including the lower boiling cracked conducts discharged through connection 10 are subjected to conventional fractionation, condensation and recovery operations.

This invention includes the cracking operation itself as one step in the combined operation, but the invention is not concerned with specific catalysts, specific temperatures, specific pressures, specific periods and other specific conditions characteristic of particular catalysts and particular stocks. However, the invention will be further illustrated by the following example of an operation embodying the invention as practiced in apparatus such as that illustrated: A distillate gas oil stock is heated, in the heater 2, to a cracking temperature of 900°–950° F. at a rate high enough to avoid substantial cracking prior to discharge from the heater. To facilitate heating at this rate, the heater may be operated under a pressure substantially higher than that maintained in the digesters 3 and 8 by means of valve 31. A pressure of 30–100 pounds per square inch may be maintained in digester 3 and a pressure of 20–70 pounds per square inch may be maintained in digester 8. A synthetic alumina silicate, effective as a cracking catalyst, is introduced into the upper end of digester 3 at a rate of 0.5–6.5 pounds per barrel of oil fed to the heater, for example. The cracking catalyst is introduced with molten lead as a carrier, the molten lead being supplied through connection 13 at a rate sufficient to maintain regular and continuous introduction of the catalyst, at a rate of 0.5–10 pounds per pound of catalyst for example. A temperature of 875°–925° F. for example is maintained in digester 3 and a temperature of 750°–900° F. for example is maintained in the upper part of digester 8. A temperature of 700°–775° F. for example is maintained in the lower end of digester 8. The rate of heater feed may be regulated for example to provide a period of oil-catalyst contact in digester 3, or in digester 3 and the upper part of digester 8, of from 2 to 150 seconds.

I claim:

1. In catalytic cracking of hydrocarbon oils at elevated temperatures, the improvement which comprises heating the oil to a cracking temperature and injecting a catalyst into the oil at cracking temperature in a molten carrier, said carrier being thermally stable at the cracking temperature, having a melting point below and a boiling point above the cracking temperature and having a specific gravity substantially higher than that of the oil at corresponding temperatures, and maintaining the oil and injected catalyst in contact at the cracking temperature for a period sufficient to effect substantial cracking.

2. In catalytic cracking of hydrocarbon oils at elevated temperatures, the improvement which comprises heating the oil to a cracking temperature and injecting a catalyst into the oil at cracking temperature in a molten carrier, said carrier being thermally stable at the cracking temperature, having a melting point below and a boiling point above the cracking temperature and having a specific gravity substantially higher than that of the oil at corresponding temperatures, maintaining the oil and injected catalyst in contact at the cracking temperature for a period sufficient to effect substantial cracking, and separating the molten carrier from the oil and the bulk of the catalyst after the injection.

3. In catalytic cracking of hydrocarbon oils at elevated temperatures, the improvement which comprises heating the oil to a cracking temperature and injecting a catalyst into the oil at cracking temperature in a molten carrier, said carrier being thermally stable at the cracking temperature, having a melting point below and a boiling point above the cracking temperature and having a specific gravity substantially higher than that of the oil and of the catalyst at corresponding temperatures, maintaining the oil and injected catalyst in contact at the cracking temperature for a period sufficient to effect substantial cracking, and separating the molten carrier from the oil and the bulk of the catalyst after the injection.

4. In catalytic cracking of hydrocarbon oils at elevated temperatures, the improvement which comprises heating the oil to a cracking temperature and injecting a catalyst into the oil at cracking temperature in a molten carrier, said carrier being thermally stable and having substantially no tendency to wet the catalyst at the cracking temperature, having a melting point below and a boiling point above the cracking temperature and having a specific gravity substantially higher than that of the oil and of the catalyst at corresponding temperatures, maintaining the oil and injected catalyst in contact at the cracking temperature for a period sufficient to effect substantial cracking, and separating the molten carrier from the oil and the bulk of the catalyst after the injection.

5. In catalytic cracking of hydrocarbon oils at elevated temperatures, the improvement which comprises heating the oil to a cracking temperature and injecting a catalyst into the oil at cracking temperature in a molten carrier, said carrier being thermally stable and having substantially no tendency to wet the catalyst at the cracking temperature, having a melting point below and a boiling point above the cracking temperature and having a specific gravity substantially higher than that of the oil and of the catalyst at corresponding temperatures, maintaining the oil and injected catalyst in contact at the cracking temperature for a period sufficient to effect substantial cracking, separating the molten carrier from the oil and the bulk of the catalyst after the injection and thereafter separating the bulk of the spent catalyst from the cracked oil.

6. In catalytic cracking of hydrocarbon oils at elevated temperatures, the improvement which comprises heating the oil to a cracking temperature and injecting a catalyst into the oil at cracking temperature in a molten carrier, said carrier being thermally stable at the cracking temperature, having a melting point below and a boiling point above the cracking temperature and having a specific gravity substantially higher than that of the oil at corresponding temperatures, maintaining the oil and injected catalyst in contact at the cracking temperature for a period sufficient to effect substantial cracking, separating the molten carrier from the oil and the bulk of the catalyst after the injection and thereafter separating the bulk of the spent catalyst from the cracked oil.

7. In catalytic cracking of hydrocarbon oils at elevated temperatures, the improvement which comprises heating the oil to a cracking temperature and injecting a catalyst into the oil at cracking temperature in a molten metallic carrier, said carrier being thermally stable at the cracking temperature, having a melting point below and a boiling point above the cracking temperature and having a specific gravity substantially higher than that of the oil at corresponding temperatures, and maintaining the oil and injected catalyst in contact at the cracking temperature for a period sufficient to effect substantial cracking.

8. In catalytic cracking of hydrocarbon oils at elevated temperatures, the improvement which comprises heating the oil to a cracking temperature and injecting a catalyst into the oil at cracking temperature in a molten metallic carrier, said carrier being thermally stable at the cracking temperature, having a melting point below and a boiling point above the cracking temperature and having a specific gravity substantially higher than that of the oil at corresponding temperatures, maintaining the oil and injected catalyst in contact at the cracking temperature for a period sufficient to effect substantial cracking, and separating the molten carrier from the oil and the bulk of the catalyst after the injection.

9. In catalytic cracking of hydrocarbon oils at elevated temperatures, the improvement which comprises heating the oil to a cracking temperature and injecting a catalyst into the oil at cracking temperature in a molten metallic carrier, said carrier being thermally stable at the cracking temperature, having a melting point below and a boiling point above the cracking temperature and having a specific gravity substantially higher than that of the oil at corresponding temperatures, maintaining the oil and injected catalyst in contact at the cracking temperature for a period sufficient to effect substantial cracking, separating the molten carrier from the oil and the bulk of the catalyst after the injection and thereafter separating the bulk of the spent catalyst from the cracked oil.

10. In catalytic cracking of hydrocarbon oils at elevated temperatures, the improvement which comprises heating the oil to a cracking temperature and injecting a catalyst into the oil at cracking temperature in a molten metallic carrier, said carrier being thermally stable at the cracking temperature, having a melting point below and a boiling point above the cracking temperature and having a specific gravity substantially higher than that of the oil and of the catalyst at corresponding temperatures, maintaining the oil and injected catalyst in contact at the cracking temperature for a period sufficient to effect substantial cracking, and separating the molten carrier from the oil and the bulk of the catalyst after the injection.

JOHN W. TETER.